US008527459B2

(12) United States Patent
Yang et al.

(10) Patent No.: US 8,527,459 B2
(45) Date of Patent: Sep. 3, 2013

(54) SYSTEM AND METHOD FOR DATA REPLICATION BETWEEN HETEROGENEOUS DATABASES

(75) Inventors: Yanming Yang, Shanghai (CN); Lin Chen, Shanghai (CN); Jinzhi Hua, Shanghai (CN); Yuming Mao, Shanghai (CN); Xiao Zhuang, Shanghai (CN); Zhijun Lu, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 0 days.

(21) Appl. No.: 13/393,206

(22) PCT Filed: Aug. 31, 2010

(86) PCT No.: PCT/CN2010/001322
§ 371 (c)(1),
(2), (4) Date: May 1, 2012

(87) PCT Pub. No.: WO2011/026313
PCT Pub. Date: Mar. 10, 2011

(65) Prior Publication Data
US 2012/0246116 A1    Sep. 27, 2012

(30) Foreign Application Priority Data
Sep. 2, 2009    (CN) .......................... 2009 1 0195022

(51) Int. Cl.
G06F 7/00       (2006.01)
G06F 17/00      (2006.01)
G06F 13/00      (2006.01)
G06F 13/28      (2006.01)
G06F 15/16      (2006.01)

(52) U.S. Cl.
USPC .......................... 707/635; 707/634; 711/147

(58) Field of Classification Search
USPC .................................. 707/635, 634; 711/147
See application file for complete search history.

(56) References Cited

U.S. PATENT DOCUMENTS

| | | | | |
|---|---|---|---|---|
| 4,771,375 A | * | 9/1988 | Beglin et al. | 711/165 |
| 2005/0246385 A1 | * | 11/2005 | Nishino et al. | 707/999.2 |
| 2008/0140608 A1 | * | 6/2008 | Takahashi et al. | 707/999.002 |
| 2009/0125563 A1 | * | 5/2009 | Wong et al. | 707/999.2 |

FOREIGN PATENT DOCUMENTS

| | | |
|---|---|---|
| CN | 1928856 A | 3/2007 |
| CN | 101057236 A | 10/2007 |

OTHER PUBLICATIONS

Wang, et al., "Using Delphi to Batch Move Data between heterogeneous Databases," *Journal of Henan Normal University (Normal Science)*, vol. 29, No. 2, May 31, 2001, pp. 118-121.

* cited by examiner

*Primary Examiner* — Greta Robinson
*Assistant Examiner* — Brian E. Weinrich
(74) *Attorney, Agent, or Firm* — Blakely Sokoloff Taylor & Zafman

(57) ABSTRACT

A system and a method for replicating data among heterogeneous databases are described. The system includes an initialization module for creating and initializing shared memory, a message queue and a semaphore; a processing module including a data reader, a data adapter and a data loader; a replication module for replicating the data in the shared memory to a target database according to the messages in the message queue; and a cleaning module for releasing the shared memory after the replication. The method includes creating and initializing the shared memory, the message queue and the semaphore; reading data from the source database, then converting the data into target data for a target database, and loading the target data in the shared memory; replicating the target data in the shared memory to the target database according to the messages in the message queue; and releasing the shared memory after the replication.

10 Claims, 3 Drawing Sheets

SYSTEM AND METHOD FOR DATA REPLICATION BETWEEN HETEROGENEOUS DATABASES

This is a non-provisional application claiming the benefit of International Application Number PCT/CN2010/001322 filed Aug. 31, 2010.

FIELD OF THE INVENTION

The present invention relates to a system and a method for replicating data among databases, and more particularly, relates to a system and a method for replicating data among heterogeneous databases, which belong to the technical field of database.

BACKGROUND

Database technology has developed rapidly in recent years. When choosing commercial database (such as Oracle, DB2 and Sybase etc.), large enterprises usually configure heterogeneous databases product in accordance with their actual demands, so as to improve the compatibility between different systems and the disaster recovery capability of the systems. The concept "heterogeneous databases" used herein widely includes heterogeneous computer system, heterogeneous operation system, and heterogeneous database product, and the heterogeneous database products relate to different databases management systems and different versions of a database management system.

Once the heterogeneous database products are used, it is very difficult to copy data among different databases in time with high efficiency, safety and stability. The "copy" of database herein contains the transferring of data, for example, if a batch of new data is produced to a database A by an application, then said new data has to be added into a backup database B (heterogeneous or homogeneous) in time; and the synchronizing of data, for example, the modification (or deletion) of partial data records should be timely reflected in other databases which may be used as a backup database or used for the distribution of parameters, etc.

Currently, the solutions employed in data replication among the heterogeneous databases in the art include: (1) replicating data in which the data is imported into a target database after being exported as files with specific format through a database management system; (2) capturing changes in data, where the changes in a source database are captured, and then applied to a target database which can be implanted by several particular means such as trigger, log, broadcasting and the like; and (3) providing specific product, in which a set of replication assembly with limited replication capacity is usually provided by the management system for large-scale databases.

However, each aforementioned replication techniques in the prior art has certain defects. In particular, the solution of replicating data, which requires a large number of storage overhead, has poor performance in real-time, and its performance in supporting the heterogeneous databases depends on the database manufacturers; the solution of capturing changes in data, which has a good performance in real-time, can produce an additional and heavy load on source database, and thus it is hard to fulfill the demands of transferring or synchronization of mass real-time data; and most of the replication products of specific manufactures are only provided for their own products, therefore the support which can be provided for the heterogeneous databases is not sufficient and the demands of transferring or synchronization of mass real-time data cannot be satisfied.

SUMMARY OF THE INVENTION

The object of this invention is to provide a system and a method for replicating data among heterogeneous databases, so as to address the problems of the prior art when replicating data among the heterogeneous databases, such as low efficiency, poor generality and poor performance in real time when processing mass data.

According to one aspect of the present invention, a system for replicating data among the heterogeneous databases is provided. The system comprises:

an initializing module for creating and initializing at least one shared memory, at least one message queue and at least one semaphore in a computer for data storage;

a source data processing module including a data reader for reading source data from at least one source database, a data adapter for converting the source data read by the data reader into target data to be stored in at least one target database, and a data loader for loading the converted target data into the shared memory;

a target data replication module for replicating the target data stored in the shared memory to the at least one target database according to the messages in the at least one message queue; and a cleaning module for releasing the shared memory after the data stored therein has already been copied.

Preferably, each of the at least one shared memory may correspond to a target table in a target database, and may be configured to include: a shared memory body including a plurality of shared memory segments for storing the data, wherein a basic storage unit in each shared memory segment is data element corresponding to a record or a combination of a part of fields of the record in the target table of the target database; and a shared memory header for storing the management information for the shared memory body, wherein the management information includes the quantity of the shared memory segments in the shared memory body, the quantity of the data elements in each shared memory segment, the length of the record of the target data, and the running status of each shared memory segment; and, each of the at least one message queue may comprise a task message queue for storing task messages, and an idle memory notification message queue for storing the message which notifies an occurrence of the idle shared memory segment.

Preferably, the data adapter may further include processing unit for selecting and/or reconstructing the read source data record.

Preferably, the data loader may include: a loading unit for loading the data into the shared memory segment; a locking unit for locking the shared memory header through the semaphore; a modification unit for modifying the running status of the shared memory segment stored in the shared memory header; and a control unit for searching and obtaining the idle shared memory segment that matches the data needed to be stored, and for completely storing the data needed to be stored into the idle shared memory segment by invoking the loading unit, the locking unit, and the modification unit.

Preferably, the system may comprise at least one initializing module, at least one source data processing module, at least one target data replication module and at least one cleaning module, and wherein the numbers of the source data processing modules and the target data replication modules are configured such that the speed of the source data processing module loading the data matches the speed of the target data replication module replicating the data.

Preferably, the total size of the shared memory segments in each shared memory body may be equal to the size of the idle memory notification message queue.

According to another aspect of the present invention, a method for replicating data among heterogeneous databases is provided. The method may include:

a. creating and initializing at least one shared memory, at least one message queue and at least one semaphore in a computer or data storage;

b. reading data from at least one source database, converting the read data into target data to be stored in at least one target database, and loading the converted target data into the shared memory;

c. replicating the target data in the shared memory to the at least one target database according to the messages in the at least one message queue; and d. releasing the shared memory after the data stored therein has already been copied.

Preferably, each of the at least one shared memory may correspond to a target table in a target database, and may be configured to include: a shared memory body including a plurality of shared memory segments for storing the data, wherein a basic storage unit in each shared memory segment is data element corresponding to a record or a combination of a part of fields of the record in the target table of the target database; and a shared memory header for storing the management information for the shared memory body, wherein the management information includes the quantity of the shared memory segments in the shared memory body, the quantity of the data elements in each shared memory segment, the length of the record of the target data, and the running status of each shared memory segment; and, each of the at least one message queue may comprise a task message queue for storing task messages, and an idle memory notification message queue for storing the message notifying an occurrence of the idle shared memory segment.

Preferably, the step b may further include the step of selecting and/or reconstructing the read source data record.

Preferably, the loading the converted target data into the shared memory in the step b may include:

b1. searching whether there is idle shared memory segment currently;

b2. determining the search result, and processing as follows:

if there is the idle shared memory segment, the determination whether the space of the idle shared memory segment is more than the space required for storing the target data, is further made according to the management message stored in the shared memory header corresponding to the idle shared memory segment:

If the space of idle shared memory segment is more than the space required for storing the target data, the data is directly loaded into the idle shared memory segment, and a task message is sent to the task message queue, notifying the replication of the loaded target data to the at least one target database;

If the space of idle shared memory segment is equal to the space required for storing the target data the target data is loaded firstly and the shared memory header is then locked, and the running status of the shared memory segment loaded with the target data is indicated as loading completion, and a task message is sent to the task message queue, notifying the replication of the loaded target data to the at least one target database;

Otherwise, loading a part of the data into the shared memory segment until it becomes full, and then locking the shared memory header and indicating the running status of the shared memory segment loaded with the data as loading completion, and sending a task message to the task message queue which notifies the replication of loaded data into the at least one target database, and then re-executing the step b1 until the required shared memory segment is obtained and all the remaining data is completely loaded;

Or, if there is no idle shared memory segment, the operation is suspended, and the step b1 is re-executed until a readable message occurs in the idle memory notification queue.

Preferably, each of the step a, step b, step c and step d may be carried out by at least one process, and the speed of loading source data is configured to match the speed of replicating target data.

Preferably, the total size of the shared memory segments in each of the shared memory bodies is equal to the size of the idle memory notification message queue.

The system and method for replicating data among the heterogeneous databases according to the disclosure fully utilizes the techniques of shared memory, message queues and semaphores, so as to ensure the multi-process concurrent execution of data reading, converting, storing and replicating, and therefore the mass data can be concurrently batch copied in real time among the heterogeneous databases. The system and method disclosed herein have many advantages such as high efficiency, easy migration, better generality and expandability.

BRIEF DESCRIPTION OF THE DRAWINGS

The present invention will be better understood by reading the following detailed description in combination with the embodiments and attached drawings.

DETAILED DESCRIPTION

Figure 1:
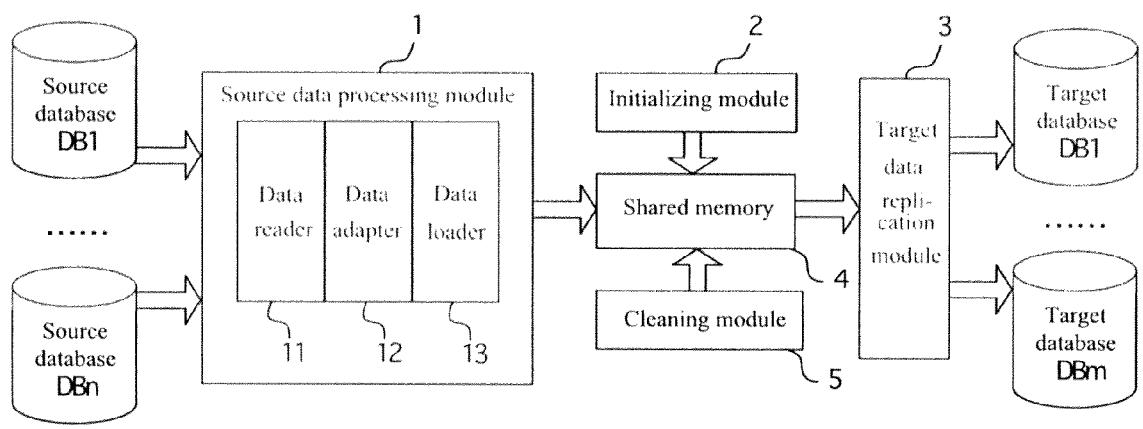
FIG. 1 illustrates a schematic block diagram of a system for replicating data among heterogeneous databases according to an embodiment of the present invention.

FIG. 1 illustrates a schematic block diagram of a system for replicating data among heterogeneous databases according to an embodiment of the present invention. As shown in FIG. 1, the system comprises a source data processing module 1, an initializing module 2, a target data replication module 3, a shared memory 4, and a cleaning module 5. Details of the above modules will be described below.

Figure 3:
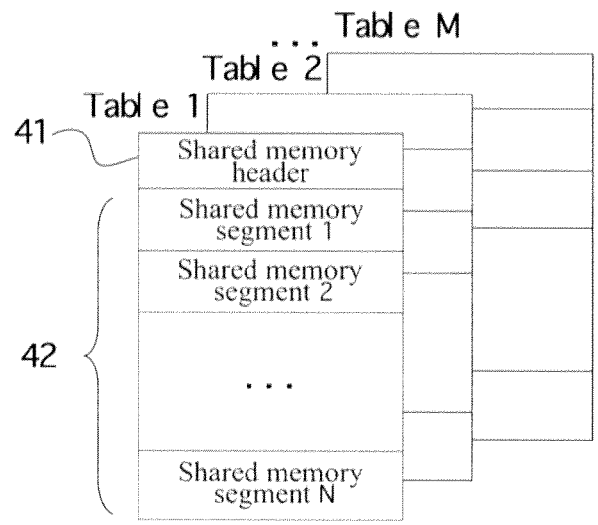
FIG. 3 illustrates a schematic block diagram of the shared memory shown in FIG. 1.

In this system, the initializing module 2 is provided for creating and initializing the shared memory 4, the message queue(s) and the semaphore(s) in a computer, where each shared memory 4 corresponds to a target table in a target database, i.e., different target tables correspond to different shared memory in an exemplary system of the invention. As shown in FIG. 3, the shared memory 4 comprises a shared memory header 41 and a shared memory body 42, in which the shared memory body 42 includes a series of shared memory segments for storing data. The basic storage unit in each shared memory segment is data element, each of which completely corresponds to a record or a combination of partial fields of the record in the target table of the target database. The advantage of such design is that the numbers of the data elements and the shared memory segments can be flexibly configured as desired, such that the use of memory can be adjusted, and at the same time the interference between different tables of the database can be reduced to decrease the possibility of error occurring in the multi-process accesses of the memory. The shared memory header 41 is provided for storing the management information for the shared memory body 42, in which such management information includes the quantity of shared memory segments in the shared memory body 42, the quantity of data elements in the shared memory segments, the length of the record of the target data, and the running status of each shared memory segment. In practice, the running status of one shared memory segment generally can be differentiated into four statuses that are indicated as respectively: "idling", "loading", "loading completion", and "in use". These four running status are set to be used by the modules. It is understood that the status is not limited to the ones as above mentioned and in some embodiment the status can be configured as desired, for example adding a new one or remove one(s) from the above mentioned four running status. Furthermore, a message queue used in the system comprises a task message queue and an idle memory notification message queue, wherein the task message queue is provided for storing various task messages (for example, the task message for loading the data to the shared memory, the task message for replicating the data to the target database, and the like), and the idle memory notification message queue specially stores the message which notifies an occurrence of the idle shared memory segment.

The source data processing module 1, which is an important intermediate data processing part of the system, comprises a data reader 11, a data adapter 12, and a data loader 13. The data reader 11, which is provided for reading source data from one or more source databases, can couple to the required source database according to the configuration parameter, thereby obtaining the required data. The data adapter 12 is provided for converting the source data read by the data reader 11 into the target data required by one or more target database. In an example, the converting of the source data into target data can be embodied by converting the format(s) of all involved data into that the format compliant with the SQL92 standard. Further, according to the actual needs, several processing units (not shown) used to select and/or reconstruct the data record can also be provided in the data adapter 12 such that its data comprehensively processing capability can be further improved while the subsequent running load can be reasonably reduced, so as to improve the overall performance of the system. The data loader 13, which is one of the key elements of this system, is provided for loading the converted target data into the shared memory 4. The specific structure and working principle of the data loader 13 will be detailed described later.

As a data replication and processing element of the system, the target data replication module 3 copies the target data stored in the shared memory 4 to the required one or more target database one by one in accordance with the requirements according to the messages in the message queue, for example, the task message in the task message queue to copy the data to target database.

After the above-mentioned data replication operation has been finished, the cleaning module 5 cleans up and releases the shared memory 4 in which all the stored data has already been copied, for storing the subsequent data.

Figure 2:
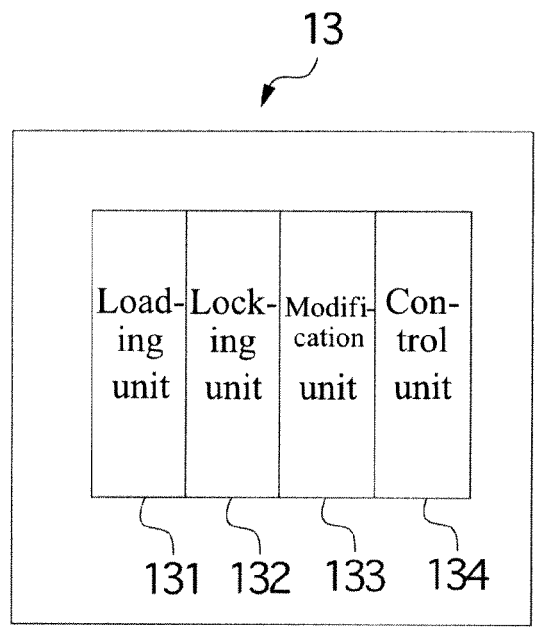
FIG. 2 illustrates a schematic block diagram of the data loader shown in FIG. 1.

The following preferred embodiment of the structure of the data loader 13, in combination with FIG. 2, will help to explain the process and the working principle of loading data into the shared memory 4. As shown in FIG. 2, the data loader 13 comprises a loading unit 131, a locking unit 132, a modification unit 133 and a control unit 134. The loading unit 131 is provided for loading the data into shared memory segment. The locking unit 132 is provided for locking the shared memory header 41 through semaphore, and the modification unit 133 is provided for modifying the shared memory segment's running status stored in the shared memory header 41. The control unit 134 is provided for searching and acquiring the idle shared memory segment which matches the data needed to be stored, and it can completely store the data needed to be stored into the idle shared memory segment by invoking the loading unit 131, the locking unit 132 and the modification unit 133. The specific processing mode of control unit 134 will be described as follows:

A, the control unit 134 searches for whether an idle shared memory segment currently exists, and it proceeds as follows according to the search result:

If there is the idle shared memory segment, the control unit 134 further determines whether the space of the idle shared memory segment is more than the required space of the data need to be stored, according to the corresponding management message stored in the shared memory header 41, and it proceeds as follows in accordance with the determination:

a1) if the space of the idle shared memory segment is more than the space required for storing the target data, then the loading unit 131 is invoked to directly load the data into the idle shared memory segment;

a2) if the space of idle shared memory segment is equal to the space required for storing the target data, the loading unit 131 is firstly invoked to load the data; the locking unit 132 is then invoked to lock the shared memory header 41, and the modification unit 133 is further called to modify the running status of the shared memory segment into which the data has been loaded to the status "loading completion", and the task message is sent to the task message queue notifying the replication of the loaded data into the required one or more target databases;

a3) otherwise, if the space of the idle shared memory segment is not enough to store the data, the loading unit 131 is firstly called to load a part of the data into the shared memory segment until it becomes full, and then the locking unit 132 is called to lock the shared memory header 41; then, the modification unit 133 is called to modify the running status of the shared memory segment into which the data has been loaded to the status "loading completion", and a task message is sent to the task message queue, notifying the replication of the loaded data into the required one or more target databases; subsequently, the above-mentioned step of searching for whether a current idle shared memory segment exists is repeated, until the required shared memory segment is obtained and all the remaining part of the data is completely loaded;

Or, if there is no idle shared memory segment, the operation is suspended and waits for a readable message occurs in the idle memory notification queue. Upon there is such readable message, the procedure A is re-processed as above mentioned.

It is noted that, each of the initializing module 2, the source data processing module 1, the target data replication module 3 and the cleaning module 5 in this system can be configured as multiple concurrent executions. Moreover, more target data replication modules 3 can be appropriately configured at one time according to practical experience because the operation related to this module is relatively time consuming. Accordingly, the speed of the source data processing module 1 loading the data, can match the speed of the target data replication module 3 replicating the data as close as possible, and thus the whole shared memory segment can be efficiently rotary used under certain initial condition.

Furthermore, after using the multi-process concurrency mode, the source data processing module 1 may not obtain the usable idle shared memory segment at some time. In order to reduce the time for monitoring the notification message queue related to idle shared memory, the size N of said message queue is set to be equal to the total size of the shared memory segments in each shared memory body 42. In this way the source data processing module 1 can be ensured to successfully find an idle shared memory segment by visiting the idle memory notification message queue for at most N+1 times, and thus the executive efficiency of the system can be better coordinated in a whole manner.

Figure 4:
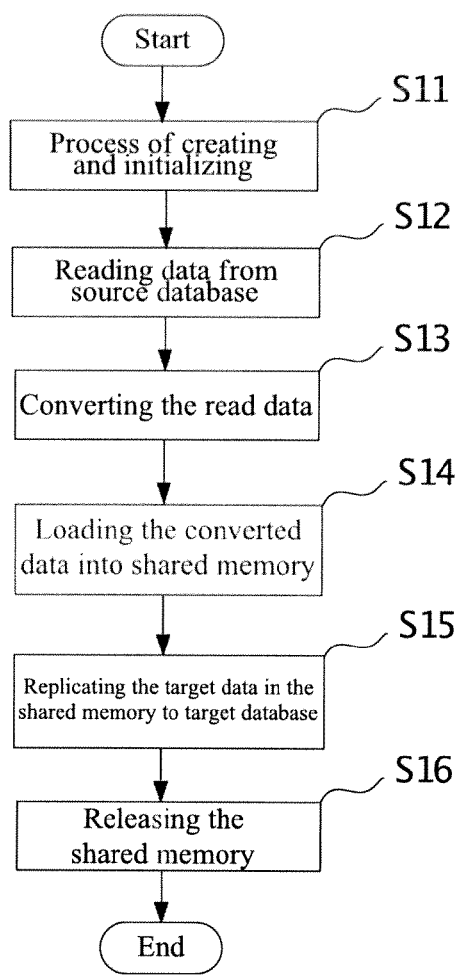
FIG. 4 is a flow chart of a method for replicating data among heterogeneous databases according to an embodiment of the present invention.

FIG. 4 is a flow chart of a method for replicating data among heterogeneous databases according to an embodiment of the present invention, the method comprises the steps of:

First of all, in step S11, creating and initializing at least one shared memory, at least one message queue and at least one semaphore in the computer for data storage;

Secondly, in step S12, reading the required data from at least one source database;

Thirdly, in step S13, converting the read data into target data to be stored in at least one target database;

Fourthly, in step S14, loading the converted data into the shared memory;

Fifthly, in step S15, replicating the target data in the shared memory to the at least one target database according to messages in the message queue;

Finally, in step S16, releasing the shared memory after the data stored therein has already been copied.

For clarity, the shared memory, massage queue, and semaphore, as well as the shared memory, shared memory header, and shared memory body as above mentioned will not be described in details herein since they have been described in details for the system of the invention hereinbefore.

Figure 5:
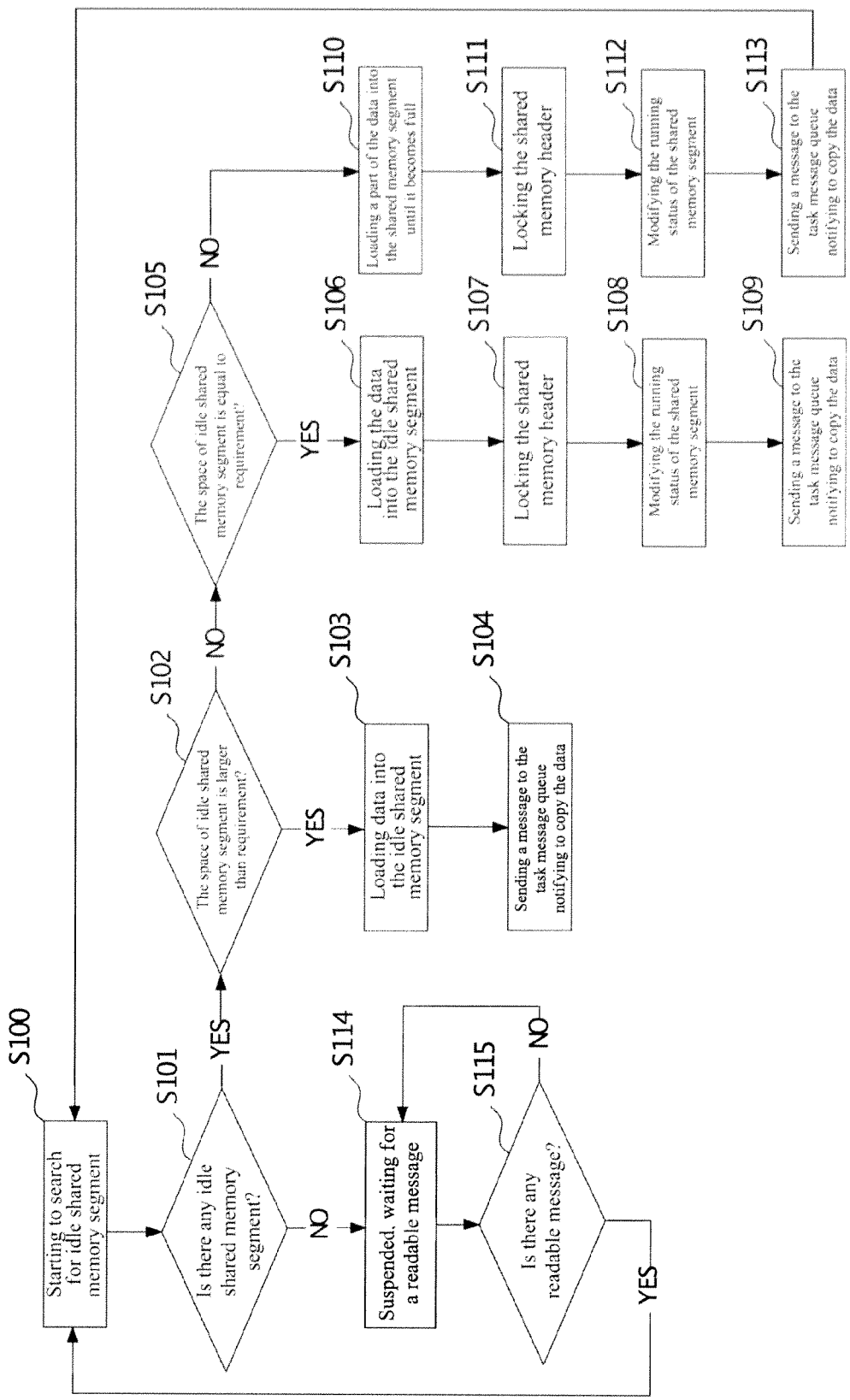
FIG. 5 shows a specific flow chart of the step in FIG. 4, in which the converted target data is loaded into the shared memory.

FIG. 5 shows a specific flow chart of the step S14 in FIG. 4, in which the converted target data is loaded into the shared memory. As shown, the step S14 further includes following steps:

Firstly, in step S100, starting to search for whether there is idle shared memory segment currently;

Secondly, in step S101, determining the search result:

If there is idle shared memory segment, then proceeding to step S102 in which the determination whether the space of the idle shared memory segment is more than the space required for storing said target data is made, according to the management message in the shared memory header corresponding to the shared memory segment;

If the space of the idle shared memory segment is more than the space required for storing the target data, then proceeding to step S103 in which the data is directly loaded into the idle shared memory segment. And then in step S104, the task message is sent to the task message queue, in order to notify the replication of the loaded target data to the required one or more target databases;

Otherwise, in step S105, further determining whether the space of the idle shared memory segment is equal to the space required or storing the target data;

If the space of the space of the idle shared memory segment is equal to the space required for storing the target data, then the target data is loaded in step S106, and then the shared memory header is locked in step S107, and the running status of the shared memory segment loaded with the target data is indicated as the status "loading completion" in step S108, and then the task message is sent to the task message queue in step S109, in order to notify the replication of the loaded target data to the required one or more target databases;

Otherwise, if the space of the idle shared memory segment is smaller than the space required for storing the target data a part of the target data is loaded (step S110) into the shared memory segment until it becomes full, and the shared memory header is subsequently locked (step S111); the running status of the shared memory segment where the data has been loaded, is further indicated (step S112) as the status "loading completion", and the task message is sent (step S113) to the task message queue to notify the replication of the loaded target data into the required one or more target databases; subsequently, re-executing step S100, until the required shared memory segment is obtained and all the remaining data is completely loaded;

If the determination of step S101 is that there exists no idle shared memory segment, then proceeding to the step S114, where the execution of the method is suspended, waiting for a readable message in the idle memory notification queue;

In step S115, further determining whether the readable message exists in the idle memory notification message queue;

If the determination of the step S115 indicates that the readable message exists in the idle memory notification message queue, then returning to the step S100; otherwise, returning to the step S114.

The details of the method for replicating data among heterogeneous databases of the present invention have been illustratively described as above discussion. It should be understood that certain modifications can be made based on the embodiments illustrated herein. For example, in another embodiment according to the present invention, a step of selecting and/or reconstructing of the data record can be added before or after converting the formats of the data into target data format of the target database in the step S13. In a further embodiment of the present invention, each of the data processing procedures involving reading, converting, loading, replicating and/or cleaning can be carried out by at least one process, and the speed of loading source data can be configured to match the speed of replicating target data as close as possible. In yet another embodiment of the invention, the size of the idle memory notification message queue is set to be equal to the total size of the shared memory segments in each shared memory body.

The advantages of these new added technical features in the embodiments of the present method have been described in the previous embodiment of the system, and therefore will not be detailed herein. It is appreciated that the technical features disclosed in this document can be combined in a suitable way to lead to a better technical effect.

It is noted that, the system and method of the present invention can be particularly applied in the fields in which there are a large amount of data conversion and data replication and transaction among heterogeneous databases, such as the fields of bank, finance, security, electronic business, and the like.

The systems and methods for replicating data among heterogeneous databases according to present invention have been illustrated by aforementioned several embodiments. These embodiments are intended to explain the principle and the implementation of the present invention but not to limit the invention. The terminology used herein is also for the purpose of describing particular embodiments only and is not intended to limit the present invention. As used herein, the singular forms "a", "an", and "the" are intended to include the plural forms as well, unless the context clearly indicates otherwise. It will be further understood that the terms "comprising", "including", and variants thereof, when used in this specification, specify the presence of stated features, steps, elements, and/or components, but do not preclude the presence or addition of one or more other features, steps, elements, components, and/or groups thereof. Those skilled in the art can make various modifications and improvements without departing the spirit and scope of the present invention. All equivalents shall be covered by the appended claims.

What is claimed is:

1. A system for replicating data among heterogeneous databases, comprising:
   an initializing module for creating and initializing at least one shared memory, at least one message queue and at least one semaphore in a computer for data storage;
   a source data processing module including a data reader for reading source data from at least one source database, a data adapter for converting the source data read by the data reader into target data to be stored in at least one target database, and a data loader for loading the converted target data into the shared memory;
   a target data replication module for replicating the target data stored in the shared memory to the at least one target database according to the messages in the at least one message queue; and
   a cleaning module for releasing the shared memory after the data stored therein has already been copied,
   wherein each of the at least one shared memory corresponds to a target table in a target database, and is configured to include:
      a shared memory body including a plurality of shared memory segments for storing the data, wherein a basic storage unit in each shared memory segment is data element corresponding to a record or a combination of a part of fields of the record in the target table of the target database; and
      a shared memory header for storing the management information for the shared memory body, wherein the management information includes the quantity of the shared memory segments in the shared memory body, the quantity of the data elements in each shared memory segment, the length of the record of the target data, and the running status of each shared memory segment,
   wherein each of the at least one message queue comprises a task message queue for storing task messages, and an idle memory notification message queue for storing the message which notifies an occurrence of the idle shared memory segment.

2. The system for replicating data among heterogeneous databases according to claim 1, wherein the data adapter further includes processing unit for selecting and/or reconstructing the read source data record.

3. The system for replicating data among heterogeneous databases according to claim 1, wherein the data loader includes:
   a loading unit for loading the data into the shared memory segment;
   a locking unit for locking the shared memory header through the semaphore;
   a modification unit for modifying the running status of the shared memory segment stored in the shared memory header; and
   a control unit for searching and obtaining the idle shared memory segment that matches the data needed to be stored, and for completely storing the data needed to be stored into the idle shared memory segment by invoking the loading unit, the locking unit, and the modification unit.

4. The system for replicating data among heterogeneous databases according to any of claims 1, 2, and 3, wherein the system comprises at least one initializing module, at least one source data processing module, at least one target data replication module and at least one cleaning module, and wherein the numbers of the source data processing modules and the target data replication modules are configured such that the speed of the source data processing module loading the data matches the speed of the target data replication module replicating the data.

5. The system for replicating data among heterogeneous databases according to any of claims 2 and 3, wherein the total size of the shared memory segments in each shared memory body is equal to the size of the idle memory notification message queue.

6. A method for replicating data among heterogeneous databases, including:
   a. creating and initializing at least one shared memory, at least one message queue and at least one semaphore in a computer for data storage;
   b. reading data from at least one source database, converting the read data into target data to be stored in at least one target database, and loading the converted target data into the shared memory;
   c. replicating the target data in the shared memory to the at least one target database according to the messages in the at least one message queue; and
   d. releasing the shared memory after the data stored therein has already been copied,
   wherein each of the at least one shared memory corresponds to a target table in a target database, and is configured to include:
      a shared memory body including a plurality of shared memory segments for storing the data, wherein a basic storage unit in each shared memory segment is data element corresponding to a record or a combination of a part of fields of the record in the target table of the target database; and
      a shared memory header for storing the management information for the shared memory body, wherein the management information includes the quantity of the shared memory segments in the shared memory body, the quantity of the data elements in each shared memory segment, the length of the record of the target data, and the running status of each shared memory segment,
   wherein each of the at least one message queue comprises a task message queue for storing task messages, and an idle memory notification message queue for storing the message which notifies an occurrence of the idle shared memory segment.

7. The method for replicating data among heterogeneous databases according to claim 6, wherein the step b further includes the step of selecting and/or reconstructing the read source data record.

8. The method for replicating data among heterogeneous databases according to claim 6, wherein the loading the converted target data into the shared memory in the step b includes:
   b1. searching whether there is idle shared memory segment currently;

b2. determining the search result, and processing as follows:

if there is the idle shared memory segment, the determination whether the space of the idle shared memory segment is more than the space required for storing the target data, is further made according to the management message stored in the shared memory header corresponding to the idle shared memory segment:

if the space of idle shared memory segment is more than the space required for storing the target data, the data is directly loaded into the idle shared memory segment, and a task message is sent to the task message queue, notifying the replication of the loaded target data to the at least one target database;

if the space of idle shared memory segment is equal to the space required for storing the target data, the target data is loaded firstly and the shared memory header is then locked, and the running status of the shared memory segment loaded with the target data is indicated as loading completion, and a task message is sent to the task message queue, notifying the replication of the loaded target data to the at least one target database;

otherwise, loading a part of the data into the shared memory segment until it becomes full, and then locking the shared memory header and indicating the running status of the shared memory segment loaded with the data as loading completion, and sending a task message to the task message queue which notifies the replication of loaded data into the at least one target database, and then re-executing the step b1 until the required shared memory segment is obtained and all the remaining data is completely loaded;

or, if there is no idle shared memory segment, the operation is suspended, and the step b1 is re-executed until a readable message occurs in the idle memory notification queue.

9. The method for replicating data among heterogeneous databases according to any of claims 6, 7, and 8, wherein each of the step a, step b, step c and step d is carried out by at least one process, and the speed of loading source data is configured to match the speed of replicating target data.

10. The method for replicating data among heterogeneous databases according to any of claims 7 and 8, wherein the total size of the shared memory segments in each of the shared memory bodies is equal to the size of the idle memory notification message queue.

* * * * *